Figure 1:
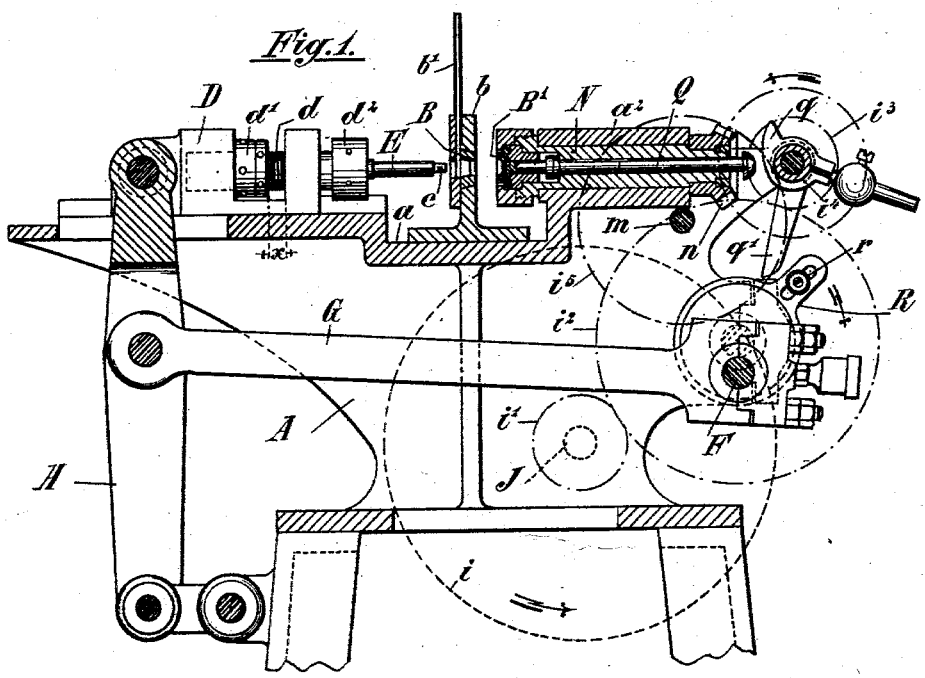

No. 634,764. Patented Oct. 10, 1899.
G. RICHTER.
MACHINE FOR MAKING METAL SCREW COVERS.
(Application filed Dec. 10, 1898.)

(No Model.) 3 Sheets—Sheet 1.

Witnesses:
Anton A. Gluczna
N. Mitchell

Inventor:
Gustav Richter
by Max Krojü
Attorney

No. 634,764. Patented Oct. 10, 1899.
G. RICHTER.
MACHINE FOR MAKING METAL SCREW COVERS.
(Application filed Dec. 10, 1898.)

(No Model.) 3 Sheets—Sheet 2.

Witnesses:
Anton A. Gloetner
N. Mitchell

Inventor:
Gustav Richter
by Max Hugo
Attorney.

No. 634,764. Patented Oct. 10, 1899.
G. RICHTER.
MACHINE FOR MAKING METAL SCREW COVERS.
(Application filed Dec. 10, 1898.)
(No Model.) 3 Sheets—Sheet 3.

Witnesses:
Anton A. Gloetzner
N. Mitchell

Inventor:
Gustav Richter
by Max Singer
Attorney.

UNITED STATES PATENT OFFICE.

GUSTAV RICHTER, OF PFORZHEIM, GERMANY.

MACHINE FOR MAKING METAL SCREW-COVERS.

SPECIFICATION forming part of Letters Patent No. 634,764, dated October 10, 1899.

Application filed December 10, 1898. Serial No. 698,910. (No model.)

*To all whom it may concern:*

Be it known that I, GUSTAV RICHTER, a citizen of the German Empire, residing at Pforzheim, Baden, Germany, have invented certain new and useful Improvements in Machines for Making Metal Screw-Covers; and I do hereby declare the following to be a full, clear, and exact description of the invention, such as will enable others skilled in the art to which it appertains to make and use the same.

This invention relates to machines for making screw caps or capsules from planchets; and it consists, substantially, in such features of improvement as will hereinafter be more particularly described.

The invention has for its object to provide means for drawing or shaping the capsule and also to automatically release the drawing or shaping tool, and finally to eject the finished capsule from the machine. These and additional objects are attained by the means illustrated in the accompanying drawings, in which—

Figure 3:
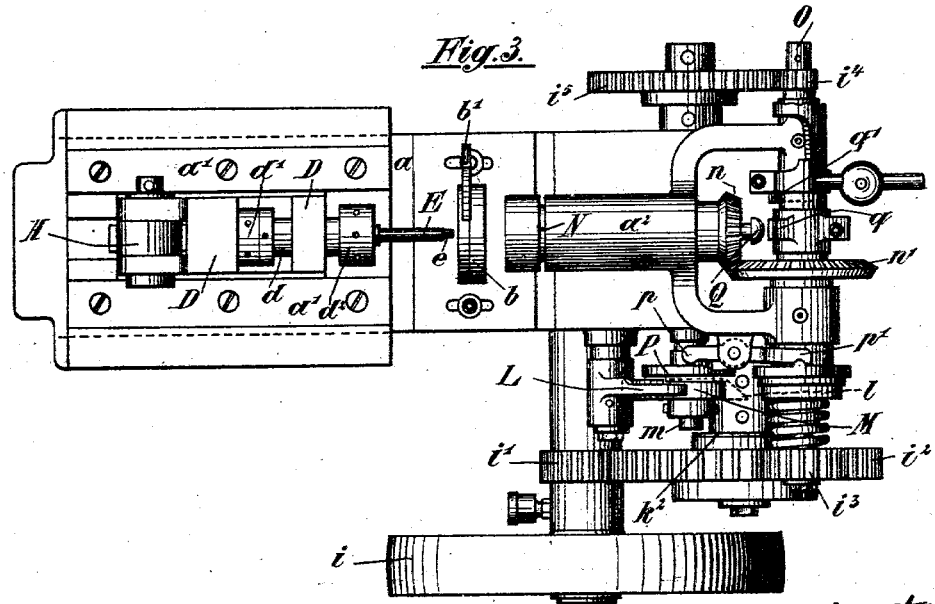
Figure 2:
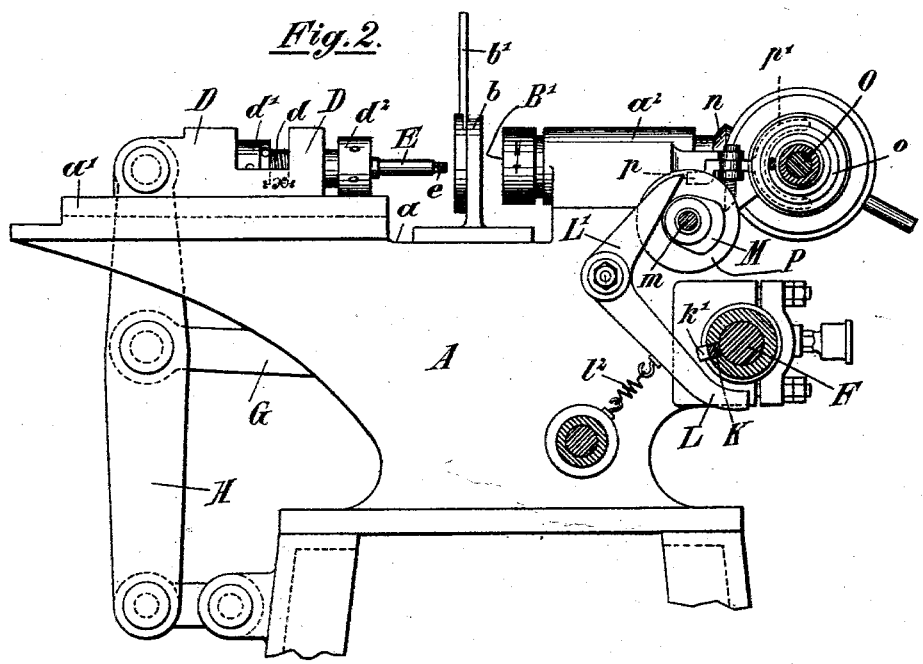
Figure 4:
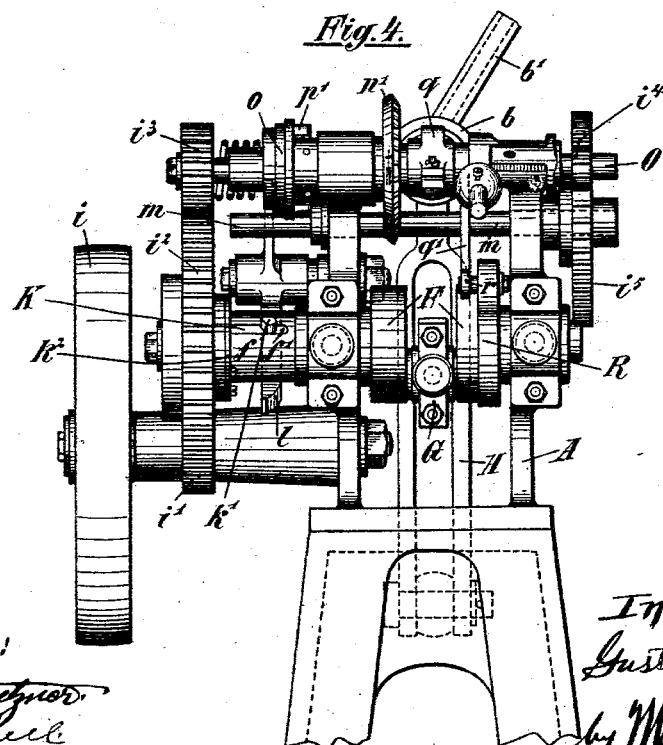
Figure 5:
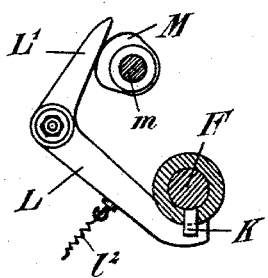
Figure 6:
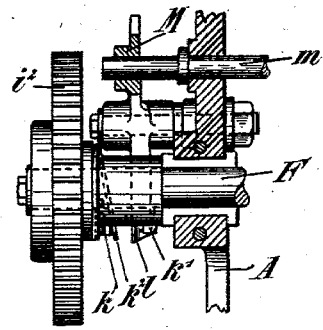

Figure 1 is a vertical longitudinal section of this improved machine; Fig. 2, a side view; Fig. 3, a plan view; Fig. 4, an end view, while Figs. 5 to 12 show various details, which will be hereinafter more particularly described.

Figure 12:
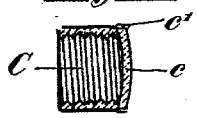

A matrix B is removably mounted in standards $b$ on a recessed part $a$ of the machine-frame A, to which matrix the metal blanks which are to be converted into screw caps or capsules C, Fig. 12, are fed through a hopper $b'$. A carriage D travels in guides $a'$ of the frame A, in which carriage a spindle $d$ is loosely mounted in such a way that the transmission of movement from the carriage D to the spindle $d$ takes place by means of a set-ring $d'$, mounted on the said spindle, so that the spindle $d$, when the carriage D is in its extreme position to the right or the left, has an independent movement equal to the distance $x$, Fig. 1. A drawing-tool or mandrel E is mounted on the spindle $d$ by means of a nut or the like $d^2$. The carriage D, and with it also the drawing-tool or mandrel E, receives its movement from a crank-shaft F by means of a connecting-rod G and a pivoted lever H, connected at one end with the frame A and at the other end with the carriage D. The crank-shaft F is operated by means of a belt-pulley $i$, which serves as a fly-wheel and is mounted on a gear-shaft J, said belt-pulley operating gearing $i'$ $i^2$. The wheel $i^2$ is mounted on, but not firmly connected with, the crank-shaft F, and is capable of being disconnected therefrom by means of a wedge K, Figs. 2, 4, and 6, in a bush $f$, fixed on the shaft F. This wedge is axially adjustable in a slot in the bush $f$, Figs. 4 and 6. The wedge has two projections $k$ and $k'$, of which the first, $k$, is always pressed by means of a spring $k^2$ into one of a series of recesses (not shown) arranged starwise or radially on the nave of the wheel $i^2$, and thus firmly connecting the crank-shaft F and the wheel $i^2$. The other projection $k'$ on the rotation of the crank-shaft F encounters an inclined surface $l$, Figs. 2, 3, and 4, formed on the arm L of an elbow-lever L L' whenever a cam M, mounted on a shaft $m$, operated by the gearing $i^4$ and $i^5$, Figs. 1, 3, and 4, brings the elbow-lever within reach of the said projection $k'$. By this means the wedge K is so adjusted that the wheel $i^2$ and crank-shaft F are disconnected by the projection $k$ emerging from the nave of the cog-wheel $i^2$ and causing the crank-shaft to become stationary so long as the cam M acts on the elbow-lever L L', Fig. 5. As soon as this ceases the elbow-lever is returned by means of the spring $l^2$ into its initial position, whereupon the spring $k^2$ brings the projection $k$ again into engagement with the nave of the wheel $i^2$ and the latter is again connected with the crank-shaft, so that the same can be again rotated.

In a guide holder or socket $a^2$, located on the frame A, is arranged a hollow rotary spindle N, Figs. 1 and 2, which carries on its end facing the end of the drawing-tool E a second matrix B', while carried on the outer end of said hollow spindle is a beveled gear-wheel $n$. The said spindle is operated by means of a larger beveled gear-wheel $n'$, carried by a sleeve $n^2$, mounted on shaft O and forming one member of a clutch for placing the spindle into and out of rotary engagement. Said sleeve $n^2$ is engaged at the end by means of a movable clutch member $o$, Fig. 3, which is embraced by and has a movable connection at 51 with the forked arms $p'$ $p^2$, Fig. 7, of a pivoted lever 52, the remaining arm $p$ of which is acted upon by a cam-disk P on the shaft $m$. During the time the shaft F is stationary the arm *p* of the lever 52 is acted upon by the thicker portion of cam-disk P in such manner as to disengage the movable clutch member *o* from the sleeve or stationary clutch member $n^2$, and consequently there is no rotation of the said hollow spindle N.

The operation of the parts of the machine is so timed, however, that as soon as the shaft F is momentarily stopped the movement of the thinner portion of said cam-disk against the end of arm *p* of lever 52 causes the movable member of the clutch to be acted upon by its spring to engage the stationary member $n^2$, and consequently the spindle is rotated. In this way the matrix B' is turned backward until it has automatically screwed itself away from the drawing-tool, whereupon the return movement of the carriage continues and the finished screw-cap is ejected. As the thicker portion of the cam-disk is gradually presented to the end of arm *p* the movable clutch member is again disengaged obviously.

Figure 9:
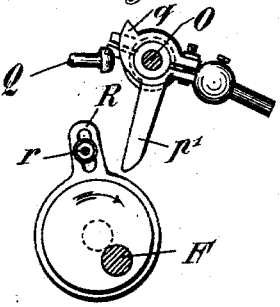
Figure 10:
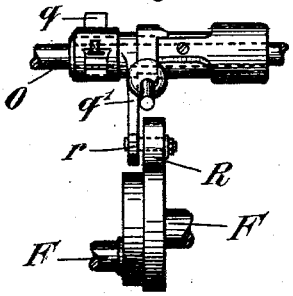
Figure 11:
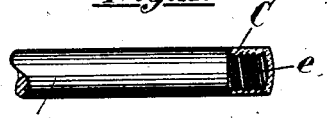

An ejector Q for the finished capsule is located in the hollow spindle N, Fig. 1, which ejector is operated by a cam *q*, loosely mounted on the shaft O, when the eccentric-pin *r*, Figs. 9 and 10, mounted on a disk R, fixed on the crank-shaft F, encounters an arm *q'*, connected with the cam *q*, by which means the ejector is driven forward, thereby ejecting the finished capsule contained in the matrix B'.

The working of the machine is as follows: The metal blanks thrown into the hopper *b'* come in front of the matrix B and are forced through the said matrix by means of the mandrel E, moved by the crank-shaft F, in the manner hereinbefore described, and in this matrix they are drawn into the form of a capsule and provided with an internal thread by means of the screw-thread on the head *e* of the mandrel E. The capsule C then adheres to the mandrel E as if it were screwed thereon, and is thus forced by the further forward movement of the said mandrel E into the matrix B', where the head-surfaces *c* and the milling or edging *c'*, Fig. 12, are formed. The carriage D is then moved backward to the extent indicated at *x*, Fig. 1; but the mandrel or drawing-tool does not partake of such movement on account of its end being retained by the capsule in the matrix. Immediately the carriage returns the crank-shaft is thrown out of operation temporarily by the action of cam M, lever L L', and wedge K in the manner already described.

Figure 7:
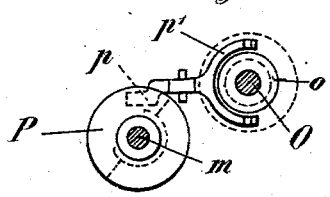
Figure 8:
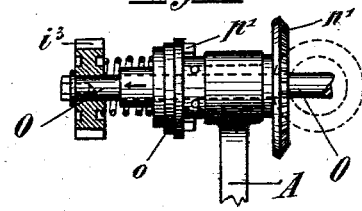

By the engagement of the clutch or coupling *o*, Figs. 7 and 8, by means of the cam-disk P and the lever *p p'*, the bevel-wheel gearing *n n'* is operated, and therewith the hollow spindle N is then rotated, while the finished capsule C is retained in the matrix B' by the milled edge *c'*, so that therefore the drawing-tool or mandrel E is ejected or pushed out of the capsule C by means of the screw-thread *e*. The mandrel E and the spindle *d* then move over the non-working space *x*, so that thus the heavy driving mechanism of the momentary stationary crank-shaft F does not share in this movement. After the mandrel E is released from the capsule C the coupling *o* is again disconnected, the hollow spindle N becomes stationary, and the ejector Q is then operated in the manner described and expels the finished capsule, which falls into a suitable collecting vessel. At this moment the cam M ceases to act on the lever L L', and consequently on the wedge K, and the crank-shaft is again coupled with the cog-wheel $i^2$ and the manufacture of a fresh capsule commences.

Instead of causing the second matrix to turn backward when the mandrel E is stationary, and thereby to screw off the capsule from the same, the matrix may be made stationary and the mandrel revoluble, or the mandrel and matrix may have an intermittent or simultaneous movement in opposite directions, and thereby effect an automatic screwing off of the capsule.

Having now particularly described and ascertained the nature of my said invention and in what manner the same is to be performed, I declare that what I claim is—

1. In a machine for making metal screw-caps and the like, the combination with a drawing-die for receiving and holding a planchet, of a movable mandrel or drawing-tool having a threaded end, means for projecting the tool against the planchet in the die to form the screw-cap, a rotatable finishing-die, and means for rotating the same to release the tool from the finished cap.

2. In a machine for making metal screw-caps and the like, the combination with a drawing-die for receiving and supporting a planchet, of a movable mandrel or drawing-tool having a screw-thread, a reciprocating device for projecting the tool against the planchet in the die to form the screw-cap, the return movement of said device being partly independent of said tool, and a rotatable finishing-die and means for rotating the same to release the tool from the finished cap.

3. In a machine for making metal screw-caps and the like, the combination with a drawing-die for receiving and supporting a planchet, of a mandrel or drawing-tool having a screw-thread, a reciprocating device for projecting the tool against the planchet in the die to form the screw-cap, and also for returning said tool to its first position, a rotatable finishing-die, and means for rotating the same to release the tool from the finished cap.

4. In a machine for making metal screw-caps and the like, the combination with a drawing-die for receiving and holding a planchet, of a mandrel or drawing-tool having a screw-thread, and an intermittently-operated reciprocating carriage for projecting the tool against the planchet in the die to form the screw-cap, the return movement of said carriage being partly independent of said tool, a rotatable finishing-die, and means for rotating the same to release the tool from the finished cap.

5. In a machine for making metal screw-caps and the like, the combination with a drawing-die for receiving and supporting a planchet, of a mandrel or drawing-tool having a thread, an intermittently-operated carriage for forcing the tool against the planchet in the die to form the screw-cap, and also for returning the tool to its first position, the return movement of the carriage being independent of the tool, a rotatable finishing-die and means for rotating the same to release the tool from the finished cap.

6. In a machine for making metal screw-caps and the like, the combination with a drawing-die for receiving and holding a planchet, of a mandrel or drawing-tool having a thread, an intermittently-operated reciprocating carriage for forcing said tool against the planchet in the die to form the screw-cap, the return movement of said carriage being partly independent of the tool, and means simultaneously releasing said tool from the finished screw-cap and returning the same the extent of such independent movement.

7. In a machine for making metal screw-caps and the like, the combination with a drawing-die for receiving and supporting a planchet, of a mandrel or drawing-tool having a thread, an intermittently-operating carriage for forcing said tool against the planchet in the die to form the screw-cap, and for completing the return of the tool to its first position, the return movement of the carriage being partly independent of the tool, and means simultaneously releasing said tool from the finished screw-cap and returning the same the extent of such independent movement.

8. In a machine for making metal screw-caps and the like, the combination with a drawing-die for receiving and supporting a planchet, of a mandrel or drawing-tool having a thread, a reciprocating device for forcing said tool against the planchet in the die to form the screw-cap, the return movement of said device being partly independent of the tool, and means for simultaneously releasing the tool from the finished screw-cap and returning the same the extent of such independent movement.

9. In a machine for making metal screw-caps and the like, the combination with a matrix or drawing-die for receiving and supporting a planchet, of a threaded mandrel or drawing-tool, an intermittently-operated reciprocating device for forcing said tool against the planchet in the die to form the screw-cap, the return movement of said device being partly independent of the tool, an edging or finishing die into which the screw-cap is carried by the continued movement of the drawing-tool, means simultaneously releasing the tool from the finished cap and returning the same the extent of such independent movement, and means for ejecting the finished screw-cap from the said finishing-die.

10. In a machine for making metal screw-caps and the like, the combination with a drawing-die for receiving and supporting a planchet, of a threaded mandrel or drawing-tool, an intermittently-operated reciprocating device for forcing said tool against the planchet in the die to form the screw-cap, the return movement of said device being partly independent of the tool, an edging or finishing die into which the screw-cap is carried by the continued movement of the tool, means for rotating said finishing-die backwardly to simultaneously release the tool from the finished cap and return the same the extent of the independent movement of said reciprocating device and means for ejecting the finished screw-cap.

11. In a machine for making metal screw-caps and the like, the combination with a drawing-die for receiving and supporting a planchet, of a threaded mandrel or drawing-tool, an intermittently-operated reciprocating device for forcing the tool against the planchet in the die to form the screw-cap, the return movement of said device being partly independent of the tool, a rotatable finishing-die or matrix into which the screw-cap is forced by the continued movement of the tool, and means for rotating said finishing-die to release the tool from the screw-cap and to return the same the extent of such independent movement.

12. In a machine for making metal screw-caps and the like, the combination with a drawing-die for receiving and supporting a planchet, of the carriage and means for reciprocating the same intermittently, a threaded mandrel or drawing-tool supported by the carriage and having a return movement partly independent of the same, a rotatable sleeve supporting a finishing-die in line with the drawing-die, and means for rotating said sleeve at intervals, substantially as described.

13. In a machine for making metal screw-caps and the like, the combination with a drawing-die for receiving and supporting a planchet, of the carriage and means for reciprocating the same intermittently, a threaded mandrel or drawing-tool supported by the carriage and having a return movement partly independent of the same, a rotatable sleeve supporting a finishing-die in line with the drawing-die, means for operating said sleeve at intervals, and an ejector for the finished screw-cap.

14. In a machine for making metal screw-caps and the like, the combination with a drawing-die for receiving and holding a planchet, the movable carriage, the threaded drawing-tool supported on the carriage and having independent movement thereon, the rotatable hollow spindle and the matrix carried thereby, the ejector, means for temporarily disconnecting the carriage on each return movement thereof, means for then rotating the spindle to release the tool from the finished screw-cap, and to return the tool the extent of its independent movement, and
5 means for then operating the ejector, the said several means operating in succession in the manner described.

In testimony whereof I affix my signature in presence of two witnesses.

GUSTAV RICHTER.

Witnesses:
A. DRAUTZ,
WM. HAHN.